United States Patent Office 3,175,983
Patented Mar. 30, 1965

3,175,983
PROCESS FOR REGENERATING A CARBON-
CONTAINING CATALYST
John Mooi, Homewood, and Stanley Manne, Park Forest,
Ill., assignors to Sinclair Refining Company, New York,
N.Y., a corporation of Maine
No Drawing. Filed Dec. 20, 1960, Ser. No. 77,019
5 Claims. (Cl. 252—416)

This invention relates to a process for regenerating a catalyst of the type described in U.S. Patent No. 2,952,-721 which includes a noble metal and boria supported on alumina. These catalysts have particular utility in the conversion of hydrocarbons at elevated temperature, e.g., in the isomerization of n-paraffinic and alkyl aromatic hydrocarbons, in the presence of a hydrogen halide of molecular weight between about 35 and 85 and usually in the presence of free hydrogen.

Difficulties have been encountered in the regeneration of catalysts employed in hydrocarbon conversion systems using hydrogen halide due to deactivation by coke deposition from use in the conversion of hydrocarbon feeds at elevated temperatures. For instance, if the carbon is burned with oxygen while the catalyst contains appreciable halide, e.g., chloride, severe noble metal, e.g., platinum, growth will occur. This presumably causes an extreme loss of platinum surface area, as can come about by platinum migration and growth, which will deactivate the catalyst. In the present process the mode of attacking this problem is to first remove chloride from the catalyst by contact with an essentially inert atmosphere, e.g., a gas which is non-oxidizing and non-halogen-containing, but may be a reducing atmosphere, at high temperature and, after the chloride content is sufficiently low, to bring the catalyst into contact with the oxidizing atmosphere to remove coke.

As described in the above patent which is incorporated by reference, the catalyst includes catalytically effective amounts of a noble or platinum group metal and boria supported on an alumina base. The catalyst generally contains about 0.01 to 2 weight percent, preferably 0.1 to 1 weight percent, of one or more of the platinum metals of Group VIII, that is platinum, palladium, rhodium, ruthenium, osmium or iridium. The small amount of noble metal may be present in the metallic form or as a sulfide, oxide or other combined form. The metal may interact with other constituents of the catalyst, but if during use the noble metal be present in metallic form, then it is preferred that it be so finely divided that it is not detectable by X-ray diffraction means, i.e., that it exists as crystals of less than 50 Angstrom units size. Of the noble metals platinum, palladium and rhodium are preferred.

The boria component is surface dispersible on the support and seems essentially inert to hydrogen halide. It is employed in amounts sufficient to enhance the life of the alumina support and such amounts are, therefore, preferably added in direct proportion to the area of the support. For instance, the amount of boria will usually be about 3 or 5 to 20 weight percent, and preferably about 8 to 15 weight percent, of the catalyst. These amounts are particularly effective on alumina having surface areas of about 350 to 600 square meters per gram (BET) before use.

In order for the catalyst to attain its activity when converting hydrocarbons, e.g., isomerizing the $C_4$ to $C_9$ n-paraffins, it is necessary to provide a hydrogen halide of molecular weight between 35 and 85, e.g., HCl and HBr, during the processing period. The hydrogen halide is added along with or in the n-paraffin feed in an amount of at least about 1 up to about 25 weight percent, based on the hydrocarbon feed, preferably at least about 1% up to about 20%, and advantageously about 5 to 15 weight percent, of the hydrogen halide or of a hydrogen halide-producing material based on the hydrocarbon feed. The addition of the hydrogen halide in these concentrations is continued over the processing period in order to maintain an adequate concentration of this component and insure the stability of the catalyst against undue aging. The hydrogen halide can be added separately to the reaction system, in the hydrogen-containing recycle gases or in the n-paraffin feedstock.

Instead of supplying the hydrogen halide with a molecular weight between 35 and 85 as such, an organo-halogen compound or other substance which will produce the hydrogen halide under the isomerization or other reaction conditions can be employed. Suitable hydrogen halide precursors of this type include the elemental halogens, chlorine and bromine; mono- and polyhalo-alkanes such as carbon tetrachloride, chloroform and tertiary butyl chloride; or other available materials which will be converted under the conditions of isomerization to obtain the desired amount of hydrogen halide.

The noble metal and boria constituents of the catalyst are deposited on an absorptive alumina base of the activated or calcined type. The base is usually the major component of the catalyst, generally constituting at least about 75 weight percent on the basis of the catalyst, preferably at least about 80 to 90%. The catalyst base is an activated or gamma-alumina such as those derived by calcination of amorphous hydrous alumina, alumina monohydrate, alumina trihydrate or their mixtures. The catalyst base precursor most advantageously is a mixture predominating, for instance about 65 to 95 weight percent, in one or more of the alumina trihydrates bayerite I, bayerite II (randomite) or gibbsite, and about 5 to 35 weight percent of alumina monohydrate (boehmite), amorphous hydrous alumina or their mixture. The alumina base can contain small amounts of other solid oxides such as silica, magnesia, natural or activated clays (such as kaolinite, montmorillonite, halloysite, etc.), titania, zirconia, etc., or their mixtures. Although the components of the catalyst can vary as stated, a preferred catalyst contains platinum and boria deposited on activated alumina.

When isomerizing with the catalyst, the isomerization reaction conditions under which the catalyst is used include a temperature sufficient to maintain the n-paraffin feed in the vapor phase under the pressure employed. Generally, this temperature will be from about 500 to 800° F., preferably about 575 to 650° F., while the pressure will be superatmospheric for instance ranging from about 200 to 1000 p.s.i.g., preferably about 300 to 600 p.s.i.g. The catalyst can be used as a fixed, moving or fluidized bed or in any other convenient type of handling system. The fixed bed system seems most advantageous at this time and the space velocity will in most cases be from about 0.25 to 8:1, preferably about 0.75 to 4:1, weighs of n-paraffin per weight of catalyst per hour (WHSV).

Free molecular hydrogen is generally present in the reaction system and the hydrogen to n-paraffin molar ratio will usually be from about 0.01 to 20:1 or more, preferably about 2 to 10:1. Conveniently, the hydrogen concentration is maintained by recycling hydrogen-rich gases from the reaction zone. These gases will usually contain hydrogen halide at least after the initial processing period and as there is usually only a small loss of the halide at processing conditions, the desired concentration in the feed may be maintained merely by recycling the hydrogen-hydrogen halide-containing gases, with a small make-up of hydrogen halide.

As previously stated the preferred catalyst base material is an activated or gamma-alumina made by calcining a precursor predominating in alumina trihydrate. An alumina of this type is disclosed in U. S. Patent No. 2,838,444. The alumina base is derived from a precursor alumina hydrate composition containing about 65 to 95 weight percent of one or more of the alumina trihydrate forms gibbsite, bayerite I and bayerite II (randomite) as defined by X-ray diffraction analysis. The substantial balance of the hydrate is amorphous hydrous or monohydrate alumina. Trihydrates are present as well defined crystallites, that is they are crystalline in form when examined by X-ray diffraction means. The crystallite size of the percursor alumina trihydrate is relatively large and usually in the 100 to 1000 Angstrom unit range. The calcined alumina has a large portion of its pore volume in the pore size range of about 100 to 1000 Angstrom units generally having about 0.1 to about 0.5 and preferably about 0.15 to about 0.3 cc./g. of pore volume in this range. As described in the patent and calcined catalyst base can be characterized by large surface area ranging from about 350 to about 550 more square meters/gram when in the virgin state as determined, for example, by the BET adsorption technique. A low area catalyst base prepared by treating the predominantly trihydrate base percursor is described in U.S. Patent No. 2,838,445. This base when in the virgin state has substantially on pores of radius less than about 10 angstrom units and the surface are of the catalyst base is less than about 350 square meters/gram and most advantageously is in the range of about 150 to 300 square meters/gram.

The platinum group metal component of the catalyst can be added to the alumina base by known procedures. For instance, the platinum metal components can be deposited on a calcined or activated alumina, but it is preferred to add the platinum metal component to the alumina hydrate precursor. Thus platinum can be added through reaction of a halogen platinum acid, for instance, fluoro-, chloro-, bromo- or iodo-platinic acid, and hydrogen sulfide in an aqueous slurry of the alumina hydrate. The hydrogen sulfide can be employed as a gas or an aqueous solution. Alternatively, the platinum component can be provided by mixing an aqueous platinum sulfide sol with the alumina hydrate. This sol can be made by reaction in an aqueous medium of a halogen platinic acid with hydrogen sulfide. The alumina hydrate containing the platinum metal can be dried and calcined usually at a temperature from about 750 to 1200° F. or more to provide the activated or gamma-alumina modifications. The boria can be added to the catalyst in any stage of its preparation. It may be incorporated in the support, for instance, by precipitation, co-precipitation, impregnation, and mulling either before or after the addition of the Group VIII metal. It can also be applied by impregnation from solution (water, organic or inorganic solvents) or from a gas phase. However, it is frequently added to the catalyst after it has been formed by tabletting or extrusion and calcined. After the boria is added in this procedure the catalyst can be recalcined.

When following the above isomerization process in which the catalyst can be used, outstanding selectivity, as an example, as high as 99+%, and good conversions of n-paraffinic hydrocarbons materials to corresponding isomeric structures are provided. For instance, the conversion of n-pentane to isopentane is generally about 50 to 70 percent and usually above about 60% based on the pentane feed; about 60 to 85 percent, usually above about 75 percent, of n-hexane is converted to iso-hexane including about 6 to 20 per cent of 2,2 dimethylbutane, a high octane component; and about 35 to 50 percent, usually about 42 percent, of n-butane is converted to isobutane.

The paraffinic feed material employed in the isomerization process is generally a $C_4$ to $C_9$ n-paraffinic-containing cut derived from crude petroleum hydrocarbons, as by distillation, reforming and extraction processes. The preferred feed however, is a blend of n-pentane and n-hexane usually containing about 25 percent or more of n-hexane and preferably a predominant amount of n-hexane.

The noble metal-boria-alumina catalyst employed in hydrocarbon conversion, for instance, an isomerization process as described above, may become deactivated during use for example, its isomerization activity is significantly reduced or more specifically, its isomerization activity is reduced below activity limits desirable for the catalyst. For instance, a deactivated catalyst can be described as one which has lost about 20 to 80 percent of its virgin activity, but preferably before it has lost about 50% of its virgin activity. Although the exact reason for this deactivation is not known, it is believed to occur as a result of some processing upset such as for example, the presence of sulfur or sulfur-containing compounds, heavier hydrocarbons, or certain aromatics in the feed materials or operation at too low a hydrogen pressure. The nature of catalyst deactivation, due to processing upsets of this character, is generally believed to result from sulfur contamination of the catalyst, or contamination due to coke fouling.

In the process of the present invention, a two-stage regeneration process is employed and involves initially heating the deactivated catalyst at temperatures of at least about 600° F., usually not above about 1100° F. and preferably from about 750° F. to 800 or 900° F. in a flowing stream of the inert stripping gas, preferably hydrogen, at a velocity generally of about 100 to 1000 or more volumes of gas per hour per volume of catalyst (VHSV), but preferably about 500 to 600 VHSV, to substantially remove the halide present, for instance, to reduce the halide content to about 1 weight percent or lower. Hydrogen is purged from the vicinity of the catalyst with nitrogen or other inert gas and an oxygen-containing or oxidizing gas is introduced, primarily to burn off carbon deposited on the catalyst during the conversion of a petroleum hydrocarbon feedstock, and an area of combustion is created in the presence of the catalyst. This oxidizing gas or oxygen-containing gas, e.g., an oxygen-nitrogen mixture, generally contains about 0.01 weight percent to 5 weight percent oxygen but preferably about 0.5 to 1.5 weight percent oxygen and is usually introduced at a flow rate such that the maximum temperature at the site of combustion is below about 960° F. The residual oxidizing gas and products of combustion are purged from the catalyst with an inert gas, e.g., nitrogen. The catalyst is generally reactivated by a treatment with hydrogen which can be introduced into the reactor when it has been purged free of all oxidizing gases. The catalyst is usually maintained at temperatures between 600 and 1100° F. during this treatment, and preferably between 800 and 1000° F., while a hydrogen flow of between 10 and 10,000 VHSV is generally maintained. Preferably the hydrogen flow rate is between about 100 and 1000 VHSV, and the pressure may be between atmospheric and the usual operating pressure.

If it is necessary to add boria to the catalyst due to losses which could occur if water inadvertently contacted the hot catalyst, it can be added in accordance with the procedures described above, and would generally be done after the purge with inert gas and before the reactivation with hydrogen.

In one modification of the present process, the catalyst can be initially heated at temperatures generally of at least about 600° F. and preferably not above about 1100° F. under a partial vacuum, generally of about 500 to 10 mm. Hg absolute and preferably of about 150 to 50 mm. Hg absolute. A primary inert gas, e.g., nitrogen, is bled into the area under vacuum, while substantially maintaining the vacuum and preferably with about two to three bleedings in succession, for the purpose of aiding in the removal of halide from the catalyst and the catalyst is purged with a secondary inert gas, e.g., nitrogen. At this point an oxygen-containing or oxidizing gas is introduced and the procedure described above is followed. The evacuated halide can be recovered in for example, a bauxite or an activated alumina absorber.

The following specific examples will serve to illustrate our invention but are not to be considered limiting.

EXAMPLE I

(A)

*Preparation of noble metal alumina composition*

A noble metal alumina composition of the kind described in U.S. Patent No. 2,838,444 can be employed in preparing the catalyst used in the process of our invention. The composition of this patent can be made as follows. Pure aluminum metal is dissolved in pure hydrochloric acid, and the resulting solution is mixed with deionized water to form an aqueous aluminum chloride solution and an alumina gel is prepared equivalent to approximately 65 grams of $Al_2O_3$ per liter. A separate deionized water solution of $NH_4OH$ is prepared containing approximately 65 grams of ammonia per liter. These two reagents in approximate volume ratio of 1:1 are intimately mixed as a flowing stream at a pH of 8.0. The flowing stream is passed to a stoneware container and an alumina hydrate is visible. The precipitated hydrate is filtered from the mother liquid and washed to <0.2% chloride by successive filtrations and reslurryings in deionized water until the desired chloride concentration is reached. In each reslurrying ammonia is added to give a pH of about 9. The washed hydrate is covered with water in a container and aged at about 90° F. until it is approximately 70% trihydrate, the remaining being substantially of the amorphous or monohydrate forms. The total hydrate composition is comprised of 42% bayerite, 18% randomite, 11% gibbsite, 20% boehmite, and 9% amorphous as determined by X-ray diffraction analysis. The aged hydrate is mixed with deionized water in a rubber lined container to provide a slurry of about 7 weight percent $Al_2O_3$ at a pH of about 8.0. A chloroplatinic acid solution in deionized water (0.102 gram platinum per milliliter) is stirred into the slurry and the slurry is then contacted with a deionized water solution which has been saturated with $H_2S$ at 78° F. to precipitate the platinum. The pH of the slurry is adjusted to 6.0 to 6.5 by ammonium hydroxide addition and the solids of the slurry are dried on a horizontal drum drier to give a powder of generally less than 20 mesh. The drum dried powder is mixed in a planetary type dough beater with sufficient deionized water to indicate 26 weight percent water on a Central Scientific Company Infra-red Moisture Meter containing a 125 watt bulb, Cat. No. 26675. The resulting mixture is forced through a die plate having holes 1/16" in diameter bolted to a 3½" Welding Engineers screw extruder. The resulting strands are broken to particles of length varying generally between about 1/16" to 1".

The particles are dried at 230° F. and calcined by heating to 925° F. in a flow of nitrogen gas followed by a flow of air while the composition is maintained at a temperature in the range of 865° F. to 920° F. The composition thus produced analyzes about 0.6 weight percent of platinum which is in sufficiently divided form so as to exhibit by X-ray diffraction studies the substantial absence of crystallites or crystals of size larger than 50 Angstrom units. After the calcination the composition has an area (BET method) within the range from about 350 to 550 square meters/gram.

(B)

*Preparation of noble metal-boria-alumina catalyst*

A platinum-alumina composition prepared essentially as described above, except that air was used for the complete calcination procedure, and containing about 0.6% platinum was employed in preparing the noble metal-boria-alumina catalyst by the following procedure. 300 grams of the calcined platinum-alumina composition were weighed into a 6" crystallizing dish. 59 grams of $H_3BO_3$ were dissolved in 279 ml. of deionized water by heating to boiling. The hot boric acid solution was poured over the catalyst and stirred thoroughly with a rubber spatula. The catalyst was placed in a forced air drying oven, set at 284° F. for 4 hours. The catalyst was stirred occasionally while drying. The oven dried catalyst was transferred to a sagger and placed in a muffle furnace preheated at 1000° F. The catalyst was held at 1000° F. for 2 hours and cooled in a desiccator. Analysis: 9.95% $B_2O_3$.

(C)

*Activation of noble metal-boria-alumina catalyst*

Although the noble metal-boria-alumina catalyst can be activated during isomerization processing on stream, it can be pre-reduced or pre-activated. Pre-activation can be accomplished by treatment with hydrogen at an elevated temperature, for instance about 800 to 1000° F. Rather than pre-activate the catalyst it can be used directly in the isomerization process and the presence of the free hydrogen gas will cause activation in the initial stages of the process.

An example of pre-activation follows: 40 grams of this catalyst were supported on glass beads in the center of a 1-inch I.D. Universal Stainless Steel Reactor. The reactor was set in place in a bronze-block furnace controlled by "Microswitch" thermostats. The catalyst was heated to 850° F. under atmospheric pressure of pure hydrogen flowing at about 6 cu. ft./hr. These conditions were maintained for 2 hours. At this time the reactor is cooled to operating temperatures and reaction conditions are established for processing the paraffin feed.

EXAMPLE II

*Isomerization*

A catalyst, prepared and activated in essentially the same manner described in Example I, except air was used for the complete calcination procedure, the catalyst (480–23) contained about 6% boria and contained about 1.39% volatile matter at 1000° C., was employed in the following isomerization process, and similar catalysts were used in the other examples in this specification.

The feedstock for this example and in the other examples and data in this specification was a blend of Phillips commercial grade n-pentane and commercial grade n-hexane (approx. 32:68 vol. percent respectively). This feed generally contains between 3 to 5 weight percent benzene and 15–20 weight percent naphthenes (methylcyclopentane and cyclohexane). The feedstock was passed over Linde 4A molecular sieve before entering the reactor. A feedstock inspection is presented in Table I.

TABLE I.—FEEDSTOCK INSPECTIONS MIXED PENTANE HEXANE

[Phillips commercial grade]

| | |
|---|---|
| Sample number | 480–11503 |
| ° API | 78.2 |
| Wt. percent: | |
| $iC_5$ | 0.3 |
| $nC_5$ | 27.6 |
| 2,2 DMB | 0.2 |
| 2 MP | 5.9 |
| 3 MP | 9.1 |
| $nC_6$ | 37.1 |
| MCP | 14.8 |
| CH | 0.8 |
| Benzene | 4.2 |
| Sulfur, wt. percent | 0.0032 |
| Nitrogen, wt. percent | 0.000 |
| Chloride, p.p.m. | 8.4 |
| Iron, p.p.m. | 0.04 |
| Fisher water, p.p.m. | 37 |
| Refractive index, 20° C. | 1.3783 |

The run was conducted under conditions specified in Table II below and this table also presents the results.

TABLE II

| Run Number | 14-200-15 |
|---|---|
| Conditions: | |
| Temp. ° F. (actual) | 636 |
| Pressure p.s.i.g. | 600 |
| WHSV | 2.07 |
| Recycle ratio mole $H_2$/mole HC | 4/1 |
| Once thru 5% $HCl \cdot H_2$, m./m. | 2/1 |
| Hours on feed | 167 |
| Wt. percent recovery | 98.88 |
| Yields ($H_2$ free basis): | |
| $C_5+$, vol. percent yield | 98.23 |
| $C_4$ minus, wt. percent | 6.22 |
| $iC_5$/total $C_5$ ratio | 62.0 |
| $iC_6$/total $C_6$ ratio | 78.8 |
| 2,2 DMB/total $C_6$ ratio | 10.1 |
| HCl conc. in reactor, mol. percent | 2.9 |

After 371 hours of processing under essentially the same conditions, the catalyst maintained essentially the same activity and selectivity for the isomerization of n-pentane.

In a first regeneration series, coking of the catalyst by planned loss of recycle gas while processing at 635° F., 600 p.s.i.g., and 2 WHSV was used to deactivate the catalyst. This procedure simulates what could occur in commercial operation if the recycle gas compressors failed. Recycle failure results in a decrease in hydrogen partial pressure and usually an increase in those reactions which produce coke.

The first attempt at coking the catalyst using this technique resulted in only a 25 percent permanent loss in pentane isomerization activity. A larger loss of activity was apparent immediately after recycle loss, but some of this proved to be transient and activity was partially restored by a high temperature (800° F.) hydrogen purge, see Run 14-201-6 in Table III. The 25% decline in activity appears to have been due to catalyst coking.

This run was used to demonstrate the conditions necessary to remove chloride from the catalyst (designated 480-38) by a stripping gas, e.g., hydrogen, purge prior to an oxidative regeneration. The catalyst was maintained for extended periods, essentially about four distinct periods running in succession from period 1 through 4, at temperatures given for each period below, the temperatures ranging between operating temperature and the final purge temperature under the following tabulated conditions:

HYDROGEN PURGE TO REMOVE HCl FROM CATALYST

| Period | 1 | 2 | 3 | 4 |
|---|---|---|---|---|
| Conditions: | | | | |
| Time hrs | 24 | 18 | 18 | 24 |
| Temp °F | 635 | 700 | 750 | 800 |
| Pressure pounds | 600 | 600 | 600 | 600 |
| $H_2$ c.f.h. | 4 | 4 | 4 | 4 |

During these periods the off gas was tested qualitatively for the presence of hydrogen chloride, which was being removed from the catalyst. With each increase in temperature a fresh surge of HCl was observed and for this reason no temperature below about 750° F. appeared to be preferred. It was felt that temperatures in substantial excess of 800° F. or 900° F. might be harmful to the catalyst if much chloride were present. Analysis of a sample of catalyst withdrawn after the 800° F. purge showed that the chloride removal had been sufficiently thorough since the chloride content was reduced to 0.86%, a value close to that of virgin catalyst and thus regeneration could be accomplished without detrimental effects on the platinum.

After the check of activity (Run 14-201-1, for instance), the catalyst was removed, and regeneration was accomplished in glass reactors. The catalyst was given a hydrogen purge for 24 hours at 800° F., 1000 VHSV, and atmospheric pressure. The chloride content was reduced to 0.44% and the catalyst (Cat. 480-42) contained 0.50% carbon. It was regenerated by treatment with diluted oxygen (0.3% $O_2$ in $N_2$) at 850° F., about 20,000 VHSV, and atmospheric pressure for 8 hours, and in undiluted dry air for 3 hours. The carbon content was reduced to 0.03%. This regeneration was accomplished without detectable platinum crystallite growth. Isomerization was restored to the virgin level, see Run 14-203-6, for instance, however, selectivity was decreased somewhat. No property of the catalyst appeared to be significantly different from virgin except the iron content which was somewhat high at 0.029%.

TABLE III

| | Activity Check After Hydrogen Purge | Activity Check on Regenerated Catalyst |
|---|---|---|
| Run Number | 14-201-6 | 14-203-6 |
| Conditions: | | |
| Temp., ° F. (Actual) | 636 | 633 |
| Press., p.s.i.g. | 600 | 600 |
| WHSV | 2.06 | 2.02 |
| Recycle Ratio, mole $H_2$/mole HC | 4/1 | 4/1 |
| Once Thru 5% $HCl \cdot H_2$ m./m. | 2/1 | 2/1 |
| Hours on Feed | 80 | 56 |
| Wt. percent Recovery | 100.40 | 98.16 |
| Yields ($H_2$ free basis): | | |
| $C_5+$ Vol. percent yield | 97.71 | 88.24 |
| $C_4$ minus wt. percent | 5.04 | 15.51 |
| $iC_5$/Total $C_5$ Ratio | 47.1 | 61.8 |
| $iC_6$/Total $C_6$ Ratio | 69.9 | 74.9 |
| 2,2 DMB/Total $C_6$ Ratio | 4.2 | 7.3 |
| HCl conc. in reactor, mol. percent | 2.9 | 2.8 |

EXAMPLE III

The second regeneration series was similar to the first except that more severe coking conditions were used (i.e., lower pressure) and the regeneration steps were carried out in situ (pilot plant reactors). The catalyst was coked for 24 hours at 635° F., 600 p.s.i.g. and 2 WHSV. This produced only a 1% loss in pentane isomerization activity. Hence a second recycle loss was carried out for 36 hours at 635° F., 100 p.s.i.g., and 2 WHSV. The longer period of loss of recycle gas and the lower hydrogen partial pressure were both use to promote coking. A 40% loss in pentane isomerization activity was observed. After a hydrogen purge to remove hydrogen chloride (38 hours, 800° F., 4 c.f.h. of $H_2$/600 p.s.i.g.) the catalyst, containing 1.64% carbon, was regenerated in situ, at 850° F. and 130 p.s.i.g. using 0.7% $O_2$ in $N_2$ at 20 c.f.h. until no $CO_2$ was given off, 3 gm. $CO_2$ were given off in 3½ hours and the regenerated catalyst designated 480-50. No temperature rise was observed during the regeneration. Again the regeneration restored isomerization activity completely, but selectivity was somewhat lower than that obtained with virgin catalysts, e.g., 480-23.

Examination of the catalyst, Cat. 480-23, showed that no platinum crystallite growth had occurred and the carbon had been removed. All the physical properties of the catalyst were within tolerable limits although the iron content was determined to be 0.074%.

EXAMPLE IV

A third regeneration series was run in glass apparatus. Coking of the catalyst was carried out and after an activity check the catalyst was treated at 1 WHSV with n-hexane carried in a nitrogen stream ($N_2$ mol/H'C=3) at 750° F. and 600 p.s.i.g., for 4 hours. This deposited 8.4% carbon on the catalyst (Cat. 480-78), which contained 2.70% Cl, and decreased conversion to less than 10%. The conditions for this run include 605° F., 600 p.s.i.g., WHSV, 5.6/1 $H_2$/H'C. Regeneration was carried out in glass reactors where the two-step regeneration procedure was used. The catalyst was purged with hydrogen for 24 hours at 800° F., 1,000 VHSV and atmospheric pressure to reduce chloride concentration on catalyst to less than 1 weight percent (0.39%) which was designated Cat. 480–81. This catalyst was treated with diluted oxygen (0.3% $O_2$ in $N_2$) at 850° F., about 10,000 VHSV and atmospheric pressure for 21 hours, and with undiluted dry air for 2 hours at a 925° F. peak temperature.

The isomerization activity checks showed that this regeneration restored the catalyst to virgin activity and selectivity. There was no detectable platinum growth, the carbon was removed and iron contamination was negligible. This result shows that iron contamination was causing the lower selectivity observed in Examples I, II and III and that the two step regeneration technique proposed was completely successful.

EXAMPLE V

A catalyst, Cat. 480–68, which was artificially contaminated with 0.15% iron was tested for isomerization activity and selectivity. The iron content of this catalyst was about twice that of the regenerated catalysts from series one and two. As expected, selectivity of this catalyst was very poor, see Table IV. The high iron content also resulted in decreased activity. This experiment completely confirms that iron poisoning and not regeneration technique was responsible for poorer selectivity observed in Examples I, II and III.

TABLE IV

Activity checks on high iron, alumina boria catalyst (480–68)

| | |
|---|---|
| Run number | 14–214–11 |
| Conditions: | |
| Temp., °F. (actual) | 636 |
| Press., p.s.i.g. | 600 |
| WHSV | 1.94 |
| Recycle ratio, mole $H_2$/mole HC | 4/1 |
| Once thru $H_2$, m./m. | 2/1 |
| Hours on feed | 104 |
| Wt. percent recovery | 103.72 |
| Yields ($H_2$ free basis): | |
| $C_5$+, vol. percent yield | 84.39 |
| $C_4$—, wt. percent | 19.92 |
| $iC_5$/total $C_5$ ratio | 52.3 |
| $iC_6$/total $C_6$ ratio | 65.4 |
| 2,2 DMB/$TC_6$ ratio | 4.1 |
| HCl conc. in reactor, mol percent, estimated | 2.5 |

Iron contamination

Iron contamination was primarily a result of the action of hydrogen chloride and trace amounts of water on the reactor tube. These corrosion effects seem to be most severe at the high temperature (800° F.) of the hydrogen purge when hydrogen chloride is present. It did not occur in Regeneration Series 3, where these steps were carried out in a glass reactor.

The iron contamination which has been observed for the bench-scale reactors can be avoided in commercial units by eliminating surface contact between the catalyst and steel reactor as with tile or ceramic liners.

The above data and information show that the hydrocarbon conversion catalyst can be successfully regenerated to virgin activity and selectivity. The regeneration technique requires a treatment to remove chloride prior to regeneration. Failure to remove this chloride results in platinum crystallite growth during the regeneration which will result in subsequent catalyst deactivation. A hydrogen purge for 6 hours at operating temperature followed by 24 hours at 800° F. has been successful in reducing the chloride level of the catalyst to a level which permits successful regeneration.

EXAMPLE VI

This example illustrates the effect of platinum growth on isomerization activity of a catalyst prepared essentially in the same manner as in Example I.

Column A in Table V gives the results of a run made on the catalyst after it had been used for 63 hours of processing and was still essentially at virgin activity. Column B gives the results of a run made on this catalyst after it had been used for an additional 74 hours of processing during which it had met with operational upsets. Analysis of the catalyst after this run showed 2.25% Cl, 0.072% Fe, 8.02% $B_2O_3$, and 4.01% C.

The carbon was removed from the catalyst by the following regeneration procedure which does not follow the recommendations of this application in that no attempt was made to lower the chloride content of the catalyst before it was brought into contact with the oxidizing atmosphere. 21 g. of the catalyst were charged to a 1 inch diameter stainless steel reactor fitted with a thermowell and tabular alumina for the preheat and postheat sections. The reactor was placed vertically in a tube furnace and the reactor and catalyst were purged thoroughly with a 0.7% $O_2$–99.3% $N_2$ blend at atmospheric pressure and room temperature. The flow rate of the blend was set at 20 l. STP/hr., heat was turned on, and the catalyst temperature was brought to about 850° F. The pressure of the $O_2$–$N_2$ blend in the reactor was increased to 130 p.s.i.g. and these conditions were maintained for 20 hours. Pressure was reduced to atmospheric. The reactor and catalyst were purged thoroughly with prepurified nitrogen, removed from the furnace and cooled to room temperature while a flow of prepurified nitrogen was maintained. The catalyst after removal from the reactor had the appearance of virgin catalyst and it was apparent that all the coke had been removed. The catalyst was then charged to a 2-inch Pyrex reactor and heated to 900° F. in hydrogen flowing at 1000 VHSV, for 3 hours. After this treatment the catalyst was cooled in flowing prepurified nitrogen.

Results of an isomerization test on this regenerated catalyst are shown in Column C of Table V. Rather than restore activity, this treatment caused even greater loss of activity. X-ray diffraction analyses of samples of this catalyst taken at various stages in this procedure reveal platinum crystal growth occurred during the regeneration procedure. Whereas the virgin catalyst and the carbon-containing catalyst before regeneration were determined to have only a small fraction of the platinum in a form detectable by X-ray diffraction, and no significant difference in either the amount or size was discernible between the virgin and the carbon-containing catalyst, in the case of the regenerated catalyst almost all of the platinum was detectable by X-ray diffraction and determined to be in crystals of about 80–100 A. size. It is this growth of metallic platinum crystals with its accompanying loss of platinum metal surface area which is believed to be responsible for the inferior activity of the regenerated catalyst.

TABLE V

| Run Number | A 971–16 | B 960–50 | C 971–27 |
|---|---|---|---|
| Conditions: | | | |
| Temp., °F | 600 | 600 | 600 |
| Pressure, p.s.i.g | 300 | 300 | 300 |
| WHSV | 1 | 1 | 1 |
| Recycle ratio, moles $H_2$/mole HC | 5/1 | 5/1 | 5/1 |
| Once thru 5% $HCl·H_2$ m./m. | 0.6/1 | 0.6/1 | 0.6/1 |
| Yields ($H_2$ free basis): | | | |
| $C_4$ minus, wt. percent | 9.3 | 2.7 | 4.5 |
| $iC_5$/total $C_5$ ratio | 65.4 | 46.3 | 38.0 |
| $iC_6$/total $C_6$ ratio | 78.6 | 71.8 | 67.7 |
| 2,2 DMB/total $C_6$ ratio | 12.1 | 6.1 | 4.7 |

The terms "catalyst" and "hydrocarbon conversion catalyst" appearing in this specification refer to the platinum group noble metal-boria-alumina catalyst. When referred to in the data and specific examples, this catalyst contains about 0.6 percent platinum and from about 6 to 10 percent boria.

It is claimed:

1. A process for regenerating a carbon-containing catalyst deactivated in a hydrocarbon conversion process while converting hydrocarbons with about 1 to 25 weight percent hydrogen halide present based on the hydrocarbon feed to deposit halide on the catalyst and said conversion being conducted at a temperature of about 500 to 800° F. and a pressure of about 200 to 1000 p.s.i.g., said catalyst consisting essentially of about 0.01 to 2 percent of a platinum group noble metal and about 3 to 20 percent of boria supported on an activated alumina; the steps consisting essentially of heating the catalyst at temperatures from about 600 to 1100° F. in the presence of an essentially inert stripping gas for a time sufficient to reduce the halide content of the catalyst provided by said hydrocarbon conversion in the presence of hydrogen halide below about 1 weight percent, and introducing an oxidizing, free oxygen-containing gas to burn carbon present on the catalyst.

2. The process of claim 1 wherein the catalyst is heated at temperatures from about 750 to 800° F. to reduce the halide content.

3. The process of claim 1 wherein the noble metal is platinum, the catalyst contains from about 5 to 15% boria, and the alumina is derived by calcination of an alumina hydrate precursor consisting essentially of from about 65 to 95% of alumina trihydrate and about 5 to 35% of a member selected from the group consisting of amorphous hydrous alumina, alumina monohydrate and their mixture.

4. The process of claim 1 wherein the catalyst is heated at temperatures from about 750 to 900° F., and the stripping gas is hydrogen.

5. The process of claim 2 wherein the stripping gas is hydrogen.

References Cited in the file of this patent

UNITED STATES PATENTS

| | | |
|---|---|---|
| 2,916,440 | Hogin et al. | Dec. 8, 1959 |
| 2,952,721 | Thomas et al. | Sept. 13, 1960 |
| 2,980,631 | Craig et al. | Apr. 18, 1961 |
| 3,013,980 | Carr et al. | Dec. 19, 1961 |
| 3,026,268 | Keith et al. | Mar. 20, 1962 |

OTHER REFERENCES

Mellor: "Comprehensive Treatise on Inorganic and Theoretical Chemistry," vol. 5, Longmans, Green and Company, New York, 1924, pages 270, 311–314.